United States Patent
Pu

(10) Patent No.: US 7,660,884 B2
(45) Date of Patent: Feb. 9, 2010

(54) APPARATUS, SYSTEM, AND METHOD FOR GENERATING A RESOURCE UTILIZATION DESCRIPTION FOR A PARALLEL DATA PROCESSING SYSTEM

(75) Inventor: Xiaoyan Pu, Chelmsford, MA (US)

(73) Assignee: International Business Machines Corporation, Armonk, NY (US)

( * ) Notice: Subject to any disclaimer, the term of this patent is extended or adjusted under 35 U.S.C. 154(b) by 620 days.

(21) Appl. No.: 11/558,753

(22) Filed: Nov. 10, 2006

(65) Prior Publication Data

US 2008/0114870 A1     May 15, 2008

(51) Int. Cl.
    *G06F 15/173*     (2006.01)
(52) U.S. Cl. .................. 709/223; 709/224; 709/229
(58) Field of Classification Search .............. 709/223, 709/224, 229
See application file for complete search history.

(56) References Cited

U.S. PATENT DOCUMENTS

| | | | | |
|---|---|---|---|---|
| 6,049,861 | A * | 4/2000 | Bird et al. .................... | 712/28 |
| 6,205,441 | B1 | 3/2001 | Al-omari et al. ............... | 707/2 |
| 6,389,587 | B1 | 5/2002 | Lewis ............................ | 717/1 |
| 6,564,221 | B1 * | 5/2003 | Shatdal ........................ | 707/102 |
| 6,832,248 | B1 * | 12/2004 | Byrnes ........................ | 709/223 |
| 6,889,221 | B1 * | 5/2005 | Luo et al. ...................... | 707/2 |
| 7,480,734 | B1 * | 1/2009 | Thakur et al. ................ | 709/240 |
| 7,543,006 | B2 * | 6/2009 | Brown et al. ................. | 707/205 |
| 2002/0059202 | A1 | 5/2002 | Hadzikadic et al. ............ | 707/3 |
| 2003/0028642 | A1 * | 2/2003 | Agarwal et al. .............. | 709/226 |
| 2006/0069717 | A1 * | 3/2006 | Mamou et al. ................ | 709/203 |
| 2009/0012983 | A1 * | 1/2009 | Senneville et al. ........... | 707/101 |

OTHER PUBLICATIONS

"Resource estimation for parallel architectures with distributed processor/memory nodes," Thornton, MA. et al.; Journal of Computing and Information Technology, 1998, p. 4, 359-371.

"Parallel Program Performance Prediction Using Deterministic Task Graph Analysis," Adve, VS. et al.; ACM Transactions on Computer Systems, vol. 22, No. 1, Feb. 2004, p. 94-136.

"Cross-Platform Performance Prediction of Parallel Applications Using Partial Execution," Yang, LT. et al.; IEEE, 2005.

"A Resource Estimation and Call Admission Algorithm for Wireless Multimedia Networks Using the Shadow Cluster Concepts," Levine, DA. et al.; IEEE/ACM Transactions on Networking, vol. 5, No. 1, Feb. 1997.

(Continued)

*Primary Examiner*—Lashonda T Jacobs
(74) *Attorney, Agent, or Firm*—Kunzler & McKenzie

(57) ABSTRACT

An apparatus, system, and method are disclosed for generating a resource utilization description for a parallel data processing system. The method comprises developing a system model using the data flow graph for a target data processing job. The system model is then tuned based on a sample data set. The tuned system model is utilized to calculate the resource utilization description for the target data processing job. The resource utilization description may include disk space usage, scratch space usage, and processor utilization for each partition in the system. The method may further include determining a more efficient data flow graph to achieve the same results of the target data processing job.

30 Claims, 12 Drawing Sheets

OTHER PUBLICATIONS

"Fast and Accurate Resource Estimation of Automatically Generated Custom DFT IP Corel," Milder, P.A. et al.; 2006.

"A Predictive Flow Control Scheme for Efficient Network Utilization and QoS," Qiu, D. et al.; IEEE/ACM Transactions on Networking, vol. 12, No. 1, Feb. 2004.

"A Model For Predicting and Evaluating Computer Resource Consumption," Ahituv, N. et al.; Communications of the ACM, vol. 31, No. 12, Dec. 1988.

"Execution Time Prediction for Parallel Data Processing Tasks," Sandor, J. et al.; IEEE, 2002.

* cited by examiner

APPARATUS, SYSTEM, AND METHOD FOR GENERATING A RESOURCE UTILIZATION DESCRIPTION FOR A PARALLEL DATA PROCESSING SYSTEM

BACKGROUND OF THE INVENTION

1. Field of the Invention

This invention relates to computing system resource estimation and optimization, and more particularly relates to estimating and optimizing disk space and processor utilization in a parallel data integration environment.

2. Description of the Related Art

Data integration in a parallel computing environment typically involves computations with large data sets spread across many computers, or partitions. A data set consumes an area on a computer disk as a permanent storage location. An originating data set, or data source operator, consumes disk space on the originating computer, and a destination data set, or data sink operator, consumes an area on a computer disk as a permanent storage location. While data sets are processed, some operations require memory to store intermediate result sets. For example, a sorting operation may require memory to store intermediate results as the sort is executed. Intermediate memory for processing operations may be called scratch space, and is used to describe an area of disk used to store intermediate result sets. Additionally, performing operations to process data sets consumes processing capacity for the computer performing the operations.

In a parallel computing environment, various operations on data sets can be performed across many different computers, and the operational steps for processing the data sets can be intertwined and rather complicated. A description of the processing steps to be performed on one or more data sets may be called a data flow graph, or data graph. A data flow graph can be a pictorial or string representation of the relationships between operations in a data processing flow. The data flow graph describes the input data sources, the operations to be performed, and the data sink operators. The data flow graph may be coupled with various other information—for example a configuration file to describe which operations are performed on which partitions, and the data schema for each operator at the input and output for the given operator.

Predicting the resource utilization—or the disk space usage, scratch space usage, and processor utilization—for a job is important in designing the data processing job and in designing hardware or planning for upgrades to hardware. Also, if a fast and accurate prediction is available, the parameters of the job can be tested and optimized. For example, a job may comprise datasets to be merged and sorted, and the speed of completion for the job may vary considerably depending upon whether the merge or sort occurs first. The current methods for predicting resource utilization depend upon rules of thumb and extensive experience of the predictor. The nuances of a complicated parallel processing job are likely to be missed, and running multiple scenarios with a dataset to determine the best order for job execution is time prohibitive. Further, only a person with expertise in estimating resource utilization based on job parameters can even make a reasonable estimate. Further, if the estimate should prove to be incorrect, current methods make it difficult to systematically correct the estimate to develop a more reasonable model.

SUMMARY OF THE INVENTION

From the foregoing discussion, it should be apparent that a need exists for an apparatus, system, and method for generating a resource utilization description for a parallel data processing system. Beneficially, such an apparatus, system, and method would also allow a non-expert user to generate resource utilization descriptions, and facilitate checking various scenarios for optimizing a data processing job.

The present invention has been developed in response to the present state of the art, and in particular, in response to the problems and needs in the art that have not yet been fully solved by currently available resource utilization description methods. Accordingly, the present invention has been developed to provide an apparatus, system, and method for generating a resource utilization description in a parallel data processing system that overcomes many or all of the above-discussed shortcomings in the art.

A method is disclosed for optimizing a parallel data integration job on a computer system. The method includes receiving a proposed data flow graph, proposed partition information, and a proposed input data specification. The method further includes generating a target data flow graph and target partition information based on the proposed data flow graph and proposed input data specification. The method may further include executing a resource estimation tool configured to generate a performance report. The resource estimation tool comprises a plurality of modules configured to functionally execute the steps of developing a resource utilization description. The modules may include an input data specification module, a data flow module, a resource utilization description module, and a performance reporting module.

The method may further include creating one or more alternative embodiments of the proposed data flow graph, sequentially setting the target data flow graph to each alternate data flow graph, and sequentially executing the resource estimation tool to generate a plurality of performance reports. The method may include providing a data flow graph recommendation, and/or a hardware recommendation, based on the plurality of performance reports.

An apparatus is disclosed for developing a resource utilization description for a parallel data processing system. The apparatus comprises a plurality of modules configured to functionally execute the steps of developing a resource utilization description. The modules may include an input data specification module, a data flow module, a resource utilization description module, and a performance reporting module. The modules may further include a partition module and a sampling module.

The input data specification module is configured to interpret an input data specification comprising at least one data source operator and a target data set associated with each data source operator. The input data specification may further include sampling instructions. The sampling module may be configured to generate a sampling controller for each data source operator, each controller configured to send data from the data source operator according to the sampling instructions.

The data flow module is configured to interpret a data flow definition comprising a data integration processing flow. In one embodiment, the data flow definition comprises one or more input groups and a plurality of vertical groups loaded from a storage location. The data flow definition may further comprise one or more scratch groups loaded from a storage location. In one embodiment, the data flow module may be configured to calculate one or more input groups and a plurality of vertical groups by parsing a data flow graph and a configuration file. The data flow module may be further configured to calculate one or more scratch groups by parsing the data flow graph. The data flow definition may further comprise partition information.

The resource utilization description module is configured to determine a resource utilization description based on the input data specification and the data flow definition. The resource utilization description module may comprise a disk space usage, a scratch space usage, and/or a processor usage for each operator on each partition. The resource utilization description module may be configured to calculate the disk space usage and/or processor usage by iterating through each vertical group and summing a resource requirement of each vertical group to support the target data set. The resource utilization description module may be configured to calculate the scratch space usage by selecting the maximum scratch space of any scratch group as the scratch space usage.

The resource utilization description module may determine the resource utilization description by interpreting a resource utilization model comprising a mathematical relationship between the number of records and record size description for each data source operator and the resource utilization description. Interpreting the resource utilization model may comprise loading the model from a storage location. In one embodiment, interpreting the model comprises calculating a plurality of coefficients to provide a best fit between the model and an observed resource utilization for the sample data. The sample data may comprise several waves of data, which may be of varying numbers of data records. The sampling controller(s) may be configured to send the data from each data source operator according to the data waves.

A method is disclosed for developing a resource utilization description for a parallel data processing system. The method may be implemented as a computer program product. The method includes interpreting an input data specification and interpreting a data flow definition. The method further includes determining a resource utilization description based on the input data specification and the data flow definition. The method further includes generating a performance report based on the resource utilization description.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Figure 1:
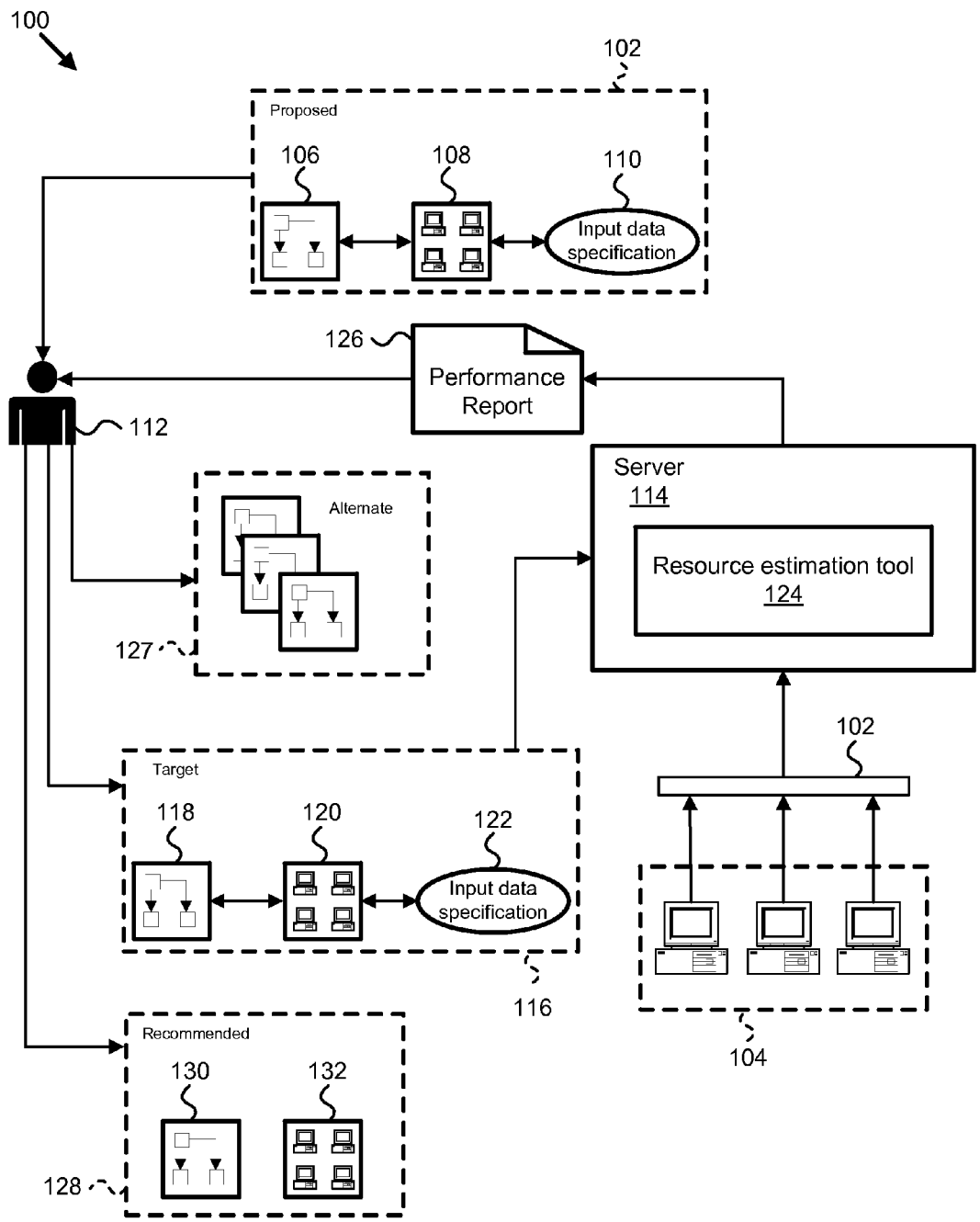
FIG. 1 is a schematic block diagram illustrating one embodiment of a system for optimizing a parallel data integration job on a computer system in accordance with the present invention.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Reference to a signal bearing medium may take any form capable of generating a signal, causing a signal to be generated, or causing execution of a program of machine-readable instructions on a digital processing apparatus. A signal bearing medium may be embodied by a transmission line, a compact disk, digital-video disk, a magnetic tape, a Bernoulli drive, a magnetic disk, a punch card, flash memory, integrated circuits, or other digital processing apparatus memory device.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

FIG. 1 is a schematic block diagram illustrating one embodiment of a system 100 for optimizing a parallel data integration job 102 on a computer system 104 in accordance with the present invention. The parallel data integration job 102 may comprise a proposed job 102 comprising a proposed data flow graph 106, proposed partition information 108, and at least one data source operator and a set of information associated with the data source operator(s) that may be included in an input data specification 110. The information associated with the data source operator(s) may include a proposed data set (e.g. the number of records and sizes of the records), and sampling information for the data set. The partition information 108 may comprise information indicating which operators in the data flow graph 106 operate on which partitions of the computer system 104. A partition as used herein indicates a computer within the computer system 104, a hard disk on a computer within the computer system 104, and/or a processor on a computer within the computer system 104. The proposed job 102 may comprise a planned data processing job and/or an ongoing data processing job that a user wishes to optimize.

An optimizing manager 112 may receive the proposed job 102. The manager 112 may be a computer (not shown) configured to receive the proposed job 102 over a network or the internet, a module on a server 114 that coordinates the computer system 104 that runs the parallel data integration job 102, and/or a service engineer 112 that assists a client (not shown) in optimizing the proposed job 102. The manager 112 may create a target job 116 comprising a target data flow graph 118, a target partition information 120, and a target input data specification 122 based on the proposed job 102. The target input data specification 122 may include the target data set from the proposed input data specification 110. In a first iteration of the optimization system 100, creating the target job 116 may comprise utilizing the proposed job 102.

The optimizing manager 112 may execute a resource estimation tool 124. The resource estimation tool 124 may comprise a plurality of modules configured to functionally execute the steps of generating a performance report 126 indicating the disk space usage, scratch space usage, and/or processor usage of the target job 116 on the computer system 104. The resource estimation tool 124 in the illustrated embodiment of the system 100 is shown on the server 114, but the resource estimation tool 124 may be on a different computer (not shown) in communication with the computer system 104. In one embodiment, where processor usage information is not desired, the resource estimation tool 124 does not need to be in communication with the computer system 104. The performance report 126 may indicate the resources used on each partition of the computer system 104 by each operator of the target job 116.

The optimizing manager 112 may create at least one alternative embodiment of the proposed data flow graph 106 as one or more alternate data flow graphs 127. The optimizing manager 112 may utilize the performance report 126 to generate alternate data flow graphs 127—for example if a partition of the computer system 104 appears to be over-utilized the alternate data flow graph 127 may utilize operators configured to reduce the burden on the over-utilized partition. In many cases, the choice of operators in the data flow graph 106 will trade off between utilizing more memory or more processing resources, and the performance report 126 may help the optimizing manager 112 determine whether a better trade off may be available. The optimizing manager 112 may further create alternative data flow graphs 127 based on experience, best practices, and the like.

The optimizing manager 112 may sequentially set the target data flow graph 118 to each of the alternate data flow graphs 127, and execute the resource estimation tool 124 on each resulting embodiment of the target job 116 to generate a plurality of performance reports 126. The optimizing manager 112 may then provide a recommended configuration 128 to the client based on the plurality of performance reports 126. The recommended configuration 128 may comprise a data flow graph recommendation 130 and/or a hardware recommendation 132. The hardware recommendation 132 may comprise a suggested hardware configuration, a hardware upgrade recommendation, and the like.

Figure 2:
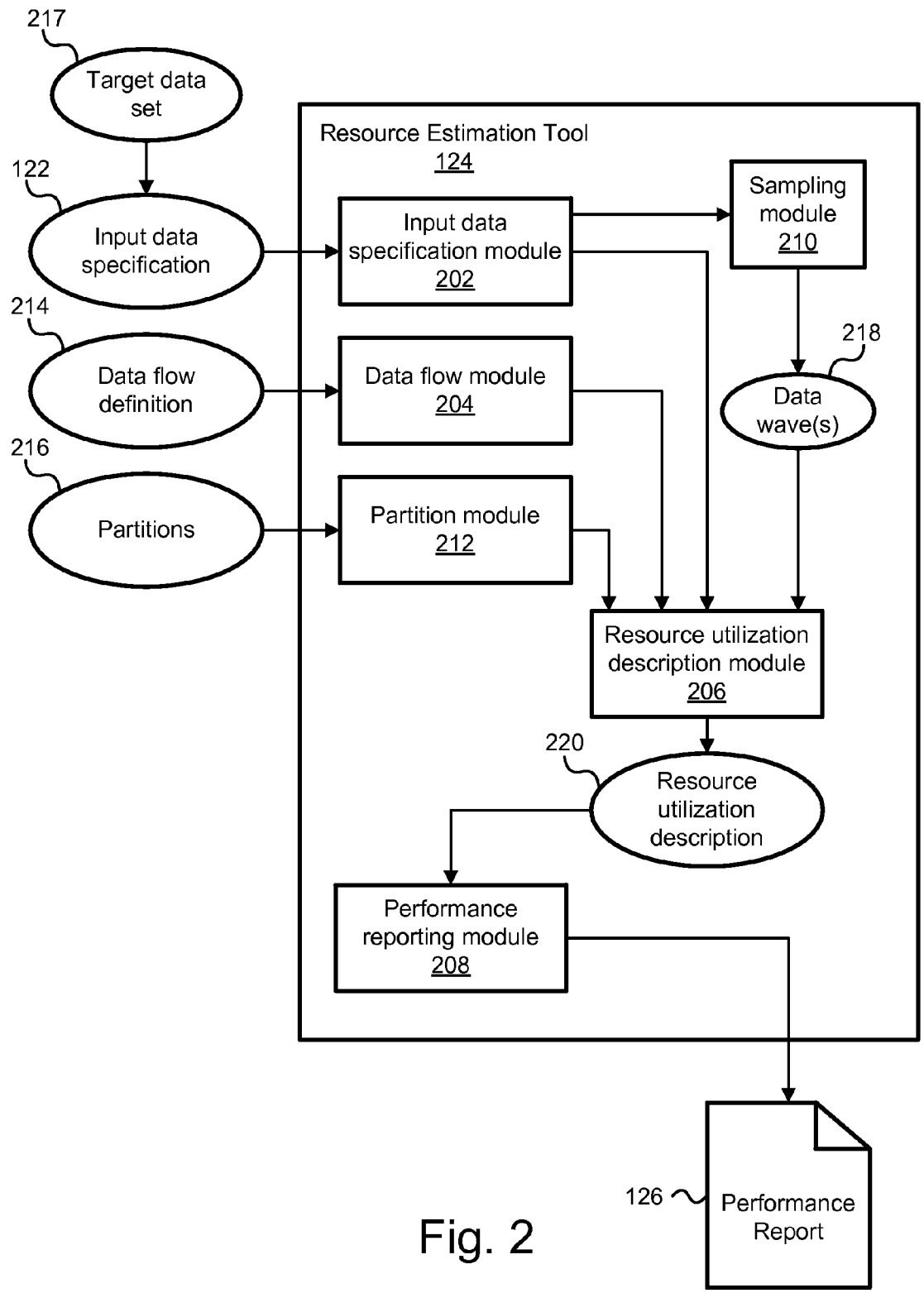
FIG. 2 is a schematic block diagram of one embodiment of an apparatus for determining a resource utilization description for a parallel data processing system in accordance with the present invention.

FIG. 2 is a schematic block diagram of one embodiment of an apparatus 124 for determining a resource utilization description for a parallel data processing system in accordance with the present invention. The apparatus 124 may comprise a resource estimation tool 124. The resource estimation tool 124 may comprise a plurality of modules configured to functionally execute determining a resource utilization description for a parallel data processing system. The resource estimation tool 124 comprises an input data specification module 202, a data flow module 204, a resource utilization description module 206, and a performance reporting module 208. The resource estimation tool 124 may further comprise a sampling module 210 and a partition module 212.

The input data specification module 202 is configured to interpret an input data specification 110 comprising at least one data source operator, and a set of information associated with the at least one data source operator. A data source operator is an operator that opens a data source stored in the computer system 104. On a data flow graph, the data source operator has an output but not an input, and the data processing job begins with at least one data source operator. The input data specification 110 may further comprise sampling instructions. The set of information associated with the data source operator may comprise a target data set which may include the number of data records and the size of the data records for the data source operator.

The sampling instructions may comprise information on the sample set to use from the data source operator to estimate all operators in the data flow graph 118. In one embodiment, the sampling instructions may be a specified data range within the data source operator, a random seed, and/or a data percentage. The data range may comprise a range of records, for example an instruction to use records 500-1000 as the sample set. The data percentage may be a specified percentage of the data source operator records to use in the sample, for example an instruction to use 5% of the data source operator records to use in the sample. A random seed may comprise a value to initiate random sampling of the data from the data source operator records.

The sampling instructions should yield a sample set representative of the data in the data source operator. If the data source operator averages 500 byte records, the sample set should average about 500 byte records to achieve the best accuracy on the resource utilization description. However, if a representative sample set is unavailable, the resource estimation tool 124 still yields useful information about the interactions of the job 116 operating within the computer system 104 based on best-guess sampling instructions.

The data flow module 204 is configured to interpret a data flow definition 214 comprising a data integration processing flow. The data flow definition 214 may comprise a plurality of operators, a plurality of vertical groups, and at least one scratch group. The data flow definition 214 may further comprise at least one input group. The data flow definition 214 may further comprise operator partition information relating each of the operators to at least one of a plurality of partitions 216.

The operators may comprise data source operators, data sink operators, and/or data processing operators. Each vertical group may comprise at least one operator expected to be executing in parallel—for example operators expected to be executing simultaneously. Each scratch group may comprise at least one operator that utilizes intermediate memory, and expected to be accessing intermediate memory in parallel with other operators in the same scratch group. In one embodiment, where the data flow graph 118 contains no operators utilizing intermediate memory, the data flow definition 214 may comprise zero scratch groups, or the data flow definition 214 may comprise one scratch group with containing zero operators. Each input group may comprise a primary data flow from a data source operator to each data sink operator that depends upon the data source operator, further including any operator in between that has any dependency upon any operator in the primary data flow.

The data flow module 204 may interpret the data flow definition 214 by loading the data flow definition 214 from a memory location, by receiving the data flow definition 214 as a user input, and/or by parsing the data flow graph 118 to determine the vertical groups, the scratch group(s), and/or the input group(s).

The partition module 212 may be configured to interpret a plurality of partitions 216. The plurality of partitions 216 combined with partition information in the data flow definition 214 define which operators from the data flow graph 118 execute on which partitions 216 of the computer system 104.

The sampling module 210 may be configured to generate at least one data wave 218 form the target data set 217 and the sampling instructions. The sampling module 210 may be further configured to generate a sampling controller associated with each data source operator, wherein the sampling controller is configured to regulate the data source operator and provide data from each data source operator according to the data wave(s) 218 during a job 116 execution. The use of data waves allows the resource estimation tool 124 to make various sampling runs on the input data 110 of different sizes to ensure that if a data size dependency exists, the dependency is modeled by the resource utilization description module 206. The sampling controller(s) regulate the sample data flow and send the data waves 218 in concert. The sampling controller(s) may be inserted into the data flow graph 118 between each data source operator and the next downstream operator, or the sampling controller(s) may be inserted into the data source operators to minimize the processing overhead of using the sampling controller(s).

The sizes of the data waves 218 may be varied to better test the range of the sample data. For example, the sample data may be split into two waves, a large wave and a small wave. In one embodiment, the sample data is divided into n waves, and the $n^{th}$ wave is a ratio of n of the first wave. For example, the sample data may be divided into five waves, where the fifth wave is five times larger, or five times smaller, than the first wave. The wave sizes may change linearly between the first and last wave, for example each wave may be larger than the previous wave by a set increment. The value of n may be limited to a range of small integers, for example from 1 to 100. A value of n equal to about ten works well for many average size data sets.

The number of waves 218 and the ratio between the first and last wave 218 should be supported by the available sample data. For example, if n waves are selected, the ratio between the first and last wave is also n, and the wave sizes are incremented linearly, then a first wave size of ten and final wave size of 1,000 implies that (1,010*50=) 50,500 sample data records are available. The actual numbers of records in each wave 218 may only approximate the designed wave 218 size depending upon the exact number of records in the sample data set.

In one embodiment, where no operators utilizing intermediate memory are in the data flow graph 118, the number of waves 218 may be set to ten times the number of data source operators, and the records in each wave may be set D*n/(sum 1:n), where D represents the number of records in the data source input with the least number of records. For example, if D is 50,000 records, and n is ten, the first wave may be 50,000*1/(55)=910 records, while the fifth wave may be 50,000*5/(55)=4546 records (values are rounded up to the nearest integer). The number of records in each data wave should be scaled or corrected based upon the number of sample data records available.

In one embodiment, where some operators are sort operators utilizing intermediate memory, the first wave size is set to the maximum of a core record number for each sort operator, where the core record number comprises the number of records needed by each sort operator to sort data in core memory. The core memory value divided by the average record size comprises the core record number. The first wave may be set to a value at least as large as the maximum of core record numbers. For example, if there are two sort operators, the core memory value is 4 megabytes for each sort operator, and the average record size for one sort operator is 4 kilobytes, then the average record size for the other sort operator is 2 kilobytes, and the first wave may be set to about 2,000 data records.

The sampling module 210 may be configured to impose a minimum number of waves comprising the lower of either ten times the number of data source operators, and 0.5*(SQRT (1+8*D/CRN)−1), where D represents the number of records in the data source operator with the least number of records, and CRN represents the maximum of core record numbers. For example, where D is 10,000 records, where CRN is 300, and where the input data specification 110 indicates only one data source operator, the number of waves may be MIN (10, 8), or eight, the first wave in the example may comprise 300 data records, and each data wave from one to eight may be about 300 records larger than the previous wave.

The actual number of data records in each wave may be adjusted to match the size of the available sample data. For example, the final data wave may be truncated or extended, the entire set of data waves may be scaled on a percentage basis, and the like. It is a mechanical step for one of skill in the art to determine the number of records in each data wave based on the size of the first data wave, the number of records in the first data wave, the number of records in the smallest data source operator, the desired wave size pattern, and the number of waves.

In one embodiment, the sampling information may comprise a desired number of waves, and ratio from the first wave to the last wave, and the sampling module may be configured to set the sampling controllers to take sample data from the data input sources accordingly. The size between waves may be changed in some other fashion than linearly, for example a geometric progression between wave sizes—and it is a mechanical step for one of skill in the art to fashion wave sizes according to the desired progression. All wave size change relationships known in the art are contemplated within the scope of the present invention.

The resource utilization description module 206 is configured to determine a resource utilization description 220 based on the input data specification 110 and the data flow definition 214. The resource utilization description 220 may comprise a disk space usage, a scratch space usage, and/or a processor usage. The usage values may be determined for each operator on each partition 216 of the computer system 104. The usage values comprise the usages to execute the target data set 217, not just the sample data set. The disk space usage comprises the permanent hard drive space estimated to be utilized on the partition 216 as a result of the job 116, and may be in memory units such as megabytes. The scratch space usage comprises the hard drive space utilized to support intermediate memory needs during the operation of the job 116 and may be in memory units such as megabytes. The processor usage comprises the processor time of each partition 216 utilized and may be in CPU usage units such as processor-seconds.

The resource utilization description module 206 may be configured to calculate the disk space usage(s) by iterating through each vertical group of the data flow graph 118 and summing the disk space requirement of each vertical group to support the target data set 217. The resource utilization description module 206 may calculate the scratch space usage by iterating through each scratch group and selecting the maximum scratch space of any scratch group as the scratch space usage.

In one embodiment, the resource utilization description module 206 is configured to determine the resource utilization description 220 by interpreting a resource utilization model comprising a mathematical relationship between the number of records and record size description of the data source operator(s) and the resource utilization description 220. The resource utilization model may comprise a plurality of coefficients. For example, the disk space usage for operator i on partition j may be expressed as:

$$y_{ij} = k_{ij} + a_{ij} * x_{ij} \qquad \text{Equation 1.}$$

Where y is the disk space usage, k is a correlation constant, a is a modeling coefficient, and x represents the input data size of the operator i on the partition j. For example, if x is 500 bytes, a is 1.2, k is 25, then y is 625 bytes. The disk space usage for a partition j is thus described as:

$$y_j = \sum_{i=1}^{N} k_{ij} + a_{ij} * x_{ij}. \qquad \text{Equation 2}$$

Where i is an iterative variable to sum all operators, from one to N, on partition j. The disk space usage for the entire job 116, including all partitions from one to M, is thus:

$$y = \sum_{j=1}^{M} \sum_{i=1}^{N} k_{ij} + a_{ij} * x_{ij}. \qquad \text{Equation 3}$$

In addition to the operators i, the effects of each link from the data flow definition 214 on the computer system 104 must be accounted for. For example, the data schema for a first operator may indicate an output data format of 15 bytes, and the data schema for a second operator may indicate an input data format of 20 bytes. If the first operator is linked to the second operator, the first operator is the producing operator and the second operator is the consuming operator. The link between the producing and the consuming operator in the example converts the data from the producer output schema to the consumer input schema, inflating the data and utilizing processor resources. Therefore, the links are added to Equation 3:

$$y = \sum_{j=1}^{M} \sum_{i=1}^{N} k_{ij} + a_{ij} * x_{ij} + \sum_{j=1}^{M} \sum_{z=1}^{L} c_{zj} + b_{zj} * \lambda_{zj}. \qquad \text{Equation 4}$$

Where λ represents a data record size on a link, and wherein c and b are modeling coefficients analogous to k and a for the operators. Each link on the datagraph 118 should be accounted for, indicating that where an operator has multiple output links, each link is modeled. Additionally, the links within an operator should be modeled as well. For example, if an operator transfers data from an input link of the operator to an output link of the operator, that link should be included within Equation 4. An operator may comprise multiple links, and each link should be included.

The utilization of Equation 4 represents one embodiment of calculating the disk space usage(s) by iterating through each vertical group and summing a disk space requirement of each vertical group to support the target data set 217. Equation 4 further represents one embodiment of a mathematical relationship between the set of information associated with the data source operator(s) and the resource utilization description 220, wherein the set of information associated with the data source operator(s) comprises a number of records and a record size description. An analog to Equation 4 exists for scratch space usage and processor space usage. It is a mechanical step for one of skill in the art to use Equation 4 to calculate those values.

The model of Equation 1 assumes that a linear relationship exists between the operator record size and the disk space usage. That assumption is not necessary, and Equation 1 can be modified for any model to describe disk space usage, scratch space usage, and/or processor usage based on the operator record size and number of records. The model for each operator may vary as well. For example, the model of processor usage for a sort operator may be of the form:

$$p_{ij}=k_{ij}+a_{ij}*x_{ij}^2+q_{ij}*x_{ij} \qquad \text{Equation 5.}$$

In Equation 5, $p_{ij}$ represents the processor usage for an operator i on a partition j, while k, a, and q are the modeling coefficients. The model for Equation 5 is a polynomial, and Equations 2 through 4 can be modified to reflect the model of Equation 5. However, each operator may have a different model, and therefore, the Equations 2 through 4 may have to be written out to sum all of the operators on all of the partitions rather than using the convenient Σ notation as shown in Equation 4. Applying non-linear models such as shown in Equation 5, and updating Equations 2 through 4 are mechanical steps for one of skill in the art, and these steps are not shown herein to avoid placing significant unnecessary material herein. The mathematical relationship (Eq 1, Eq 5) can be any model contemplated within the art, including without limitation linear, polynomial, exponential, and logarithmic.

In one embodiment, as described above, the mathematical relationship between the set of information associated with the data source operator(s) and the resource utilization description 220 comprises a plurality of coefficients (e.g. k, a, q, b, c). Interpreting the resource utilization model may comprise loading the correlation coefficients from storage, and/or receiving the correlation coefficients as user input.

In one embodiment, interpreting the correlation coefficients comprises calculating the plurality of correlation coefficients. The resource utilization model may comprise a plurality of estimated resource utilization elements (e.g. $y_{ij}$—Equation 1). Each estimated resource utilization element may comprise an estimated resource utilization contribution associated with an operation element. An operation element comprises an operator and/or a link operating on one of the partitions 216. The resource utilization description module 206 may be configured to determine a plurality of observed resource utilization elements determined according to the job 116 execution. For example, the resource estimation tool 124 may execute the target job 116 according to the data wave(s) 218, and log the resource utilization of each operator and link on each partition, generating a plurality of observed resource utilization elements each associated with one of the operation elements.

The resource utilization description module may be further configured to calculate the correlation coefficients by manipulating the correlation coefficients to minimize an error term. In one embodiment, the correlation coefficient values may be initialized to a best guess value, and the estimated resource utilization elements may be calculated based on correlation coefficient values. An error term may then be calculated. The error term may comprise the difference between each estimated resource utilization element and each corresponding observed resource utilization element. In the described embodiment, if the operator has only one input link, one output link, and the model is linear (e.g. Equation 1) the error term can be determined with a simple linear regression through the available points from the data waves 218. For more complex situations—including multiple operator links and non-linear models, numerical techniques are well known in the art to minimize the error term and calculate the correlation coefficients.

In one embodiment, the observed log data may comprise resource utilization only for an entire partition 216 rather than for each resource utilization element. In another embodiment, the observed log data may comprise resource utilization only for the entire computer system 104. In such embodiments, numerical techniques combined with reasonable best guesses for the correlation coefficients can still yield acceptable modeling results for the resource utilization description 220, and these embodiments are contemplated within the scope of the invention.

The resource utilization description module may be further configured to calculate the resource utilization description 220 based on the correlation coefficients and the target data set 217.

The performance reporting module 208 may be configured to generate a performance report 126 based on the resource utilization description. The performance report 126 may comprise the disk space usage, scratch space usage, and/or processor usage for each operator and/or link on each partition 216. The performance report 126 may further comprise the utilization values for each partition 216 for the entire job 116. The performance report 126 may comprise any format including hard copy, text file, XML file, and the like.

Figure 3A:
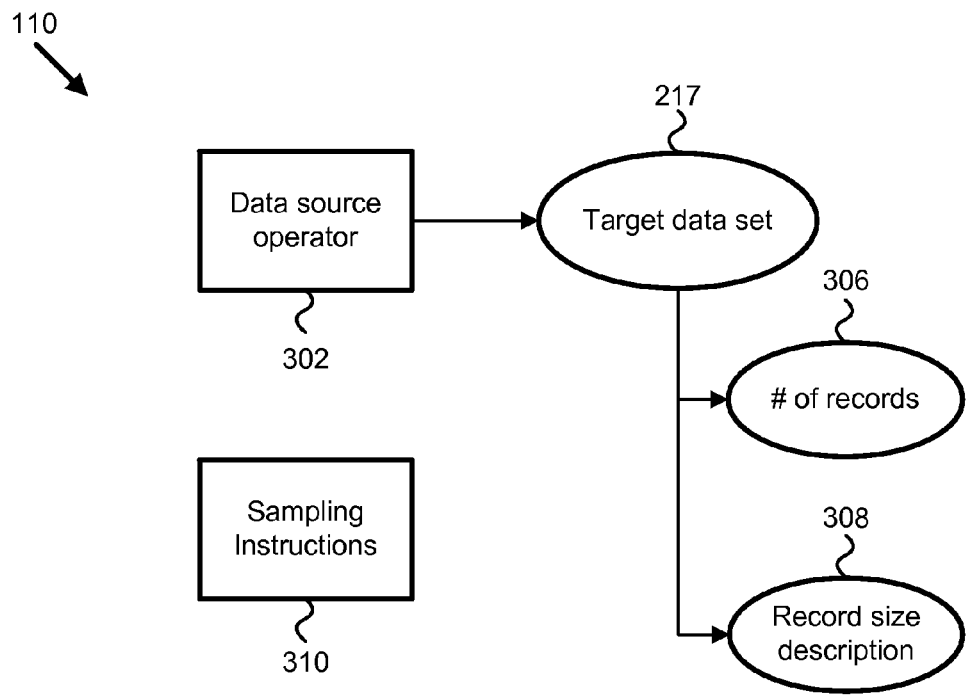
FIG. 3A is a schematic block diagram illustrating one embodiment of an input data specification in accordance with the present invention.

FIG. 3A is a schematic block diagram illustrating one embodiment of an input data specification 110 in accordance with the present invention. The input data specification 110 may comprise at least one data source operator 302 which may comprise a data source description. The data source operator(s) may comprise data records, and a set of information associated with the data source operator(s). The set of information associated with the data source operator(s) may comprise a target data set 217 which may be a number of records 306 and a record size description 308. The number of records 306 may comprise the number of records 306 in an actual job 116, or in a hypothetical job 116 intended to represent the type of workload that the computer system 104 is expected to perform. The input data specification may further comprise sampling instructions 310

Figure 3B:
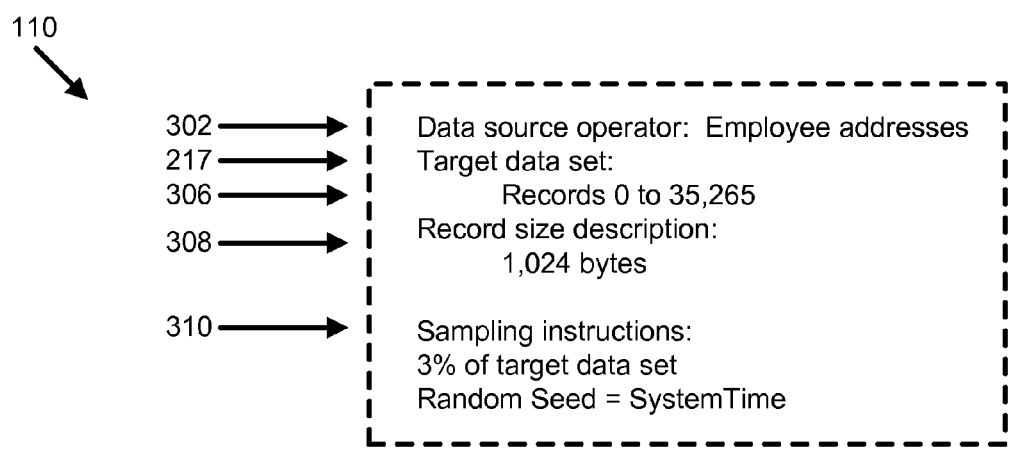
FIG. 3B is an illustration of an alternate embodiment of an input data specification in accordance with the present invention.

FIG. 3B is an illustration of an alternate embodiment of an input data specification 110 in accordance with the present invention. The input data specification 110 of FIG. 3B may be a text file, an XML formatted record, and/or any other information media accessible to the input data specification module 202. The input data specification 110 comprises the data source operator 302 "Employee addresses," the target data set 217 comprising a number of records 306 and a record size description 308. The number of records 306 may comprise a number indicating the number of records (not shown), and/or a range of records 310 from which the number of records 306 is inferable. The record size description 308 may comprise a memory size of each data record within the data source operator 302.

The record size description 308 may comprise an average expected record size description, a low-end record size description, or a high-end record size description. The low-end and high-end record size descriptions may represent approximately a smaller record (e.g. one standard deviation below an average size), and a larger record (e.g. one standard deviation above an average size). The optimizing manager 112 may select the low-end record size description 308 to estimate the computer system 104 resources required for a minimally-capable computer system 104 resources at the cost of job 116 execution performance, as the resource estimation tool 124 will indicate fewer resources are required than may actually be observed when the job 116 is performed.

The optimizing manager 112 may select the high-end record size description 308 to maximize the computer system 104 performance in executing the job 116 at the cost of potentially reserving more computer system 104 resources than execution of the job 116 actually requires. In one embodiment, the optimizing manager 112 may select a high-end record size description 308 equal to a theoretical maximum data size for the records—for example, selecting a high-end record size description 308 as if each record comprised the maximum allowable amount of data in each data field of the records to estimate the computer system 104 resources required in a worst-case scenario for executing the job 116.

The input data specification 110 may further comprise sampling instructions 310. The sampling instructions 310 in the example of FIG. 3B comprise instructions to use three percent of the target data set 217 as the sample data set, and to use a variable SystemTime, which may be the time of the server 114, as the random seed for a random function generator in taking sample data from the target data set 217.

Figure 4:
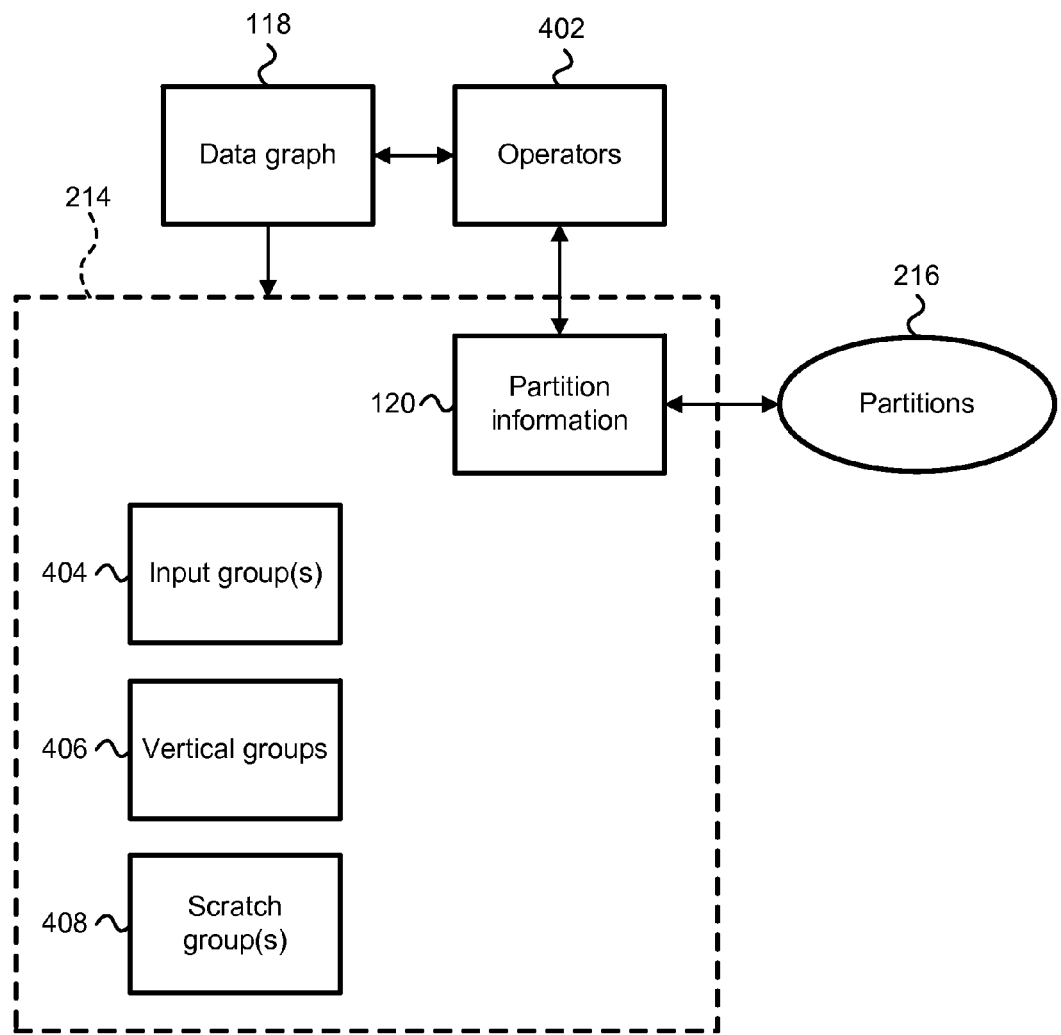
FIG. 4 is an illustration of one embodiment of a data flow definition in accordance with the present invention.

FIG. 4 is an illustration of one embodiment of a data flow definition 214 in accordance with the present invention. The data flow module 204 may be configured to determine the data flow definition 214 by parsing the data flow graph 118 to determine a plurality of vertical groups 406. The data flow module 204 may be further configured to parse the data flow graph 118 to determine at least one scratch group 408. In one embodiment, where the data flow graph 118 does not describe any operators 402 that utilize scratch space, the data flow definition 214 may not contain a scratch group 408, or may contain one scratch group 408 comprising an empty set.

The data flow definition 214 may further comprise operator partition information 120 relating each of the operators 402 to at least one of the partitions 216. The partition information 120 may be interpreted from a configuration file (not shown) utilized with the data flow graph 118 to describe the workflow of the operators 402 for the job 116.

The data flow definition 214 may further comprise one or more input groups 404. Each input group 404 may comprise a data source operator, each data sink operator that depends upon the data source operator, each operator 402 between the data source operator and the data sink operator, and any operators 402 that depend upon an output link of any operator 402 already described in the input group 404. In one embodiment, the input group 404 may be utilized to parse the scratch group(s) 408 from the data flow graph 118 (refer to the description referencing FIG. 9).

Figure 5A:
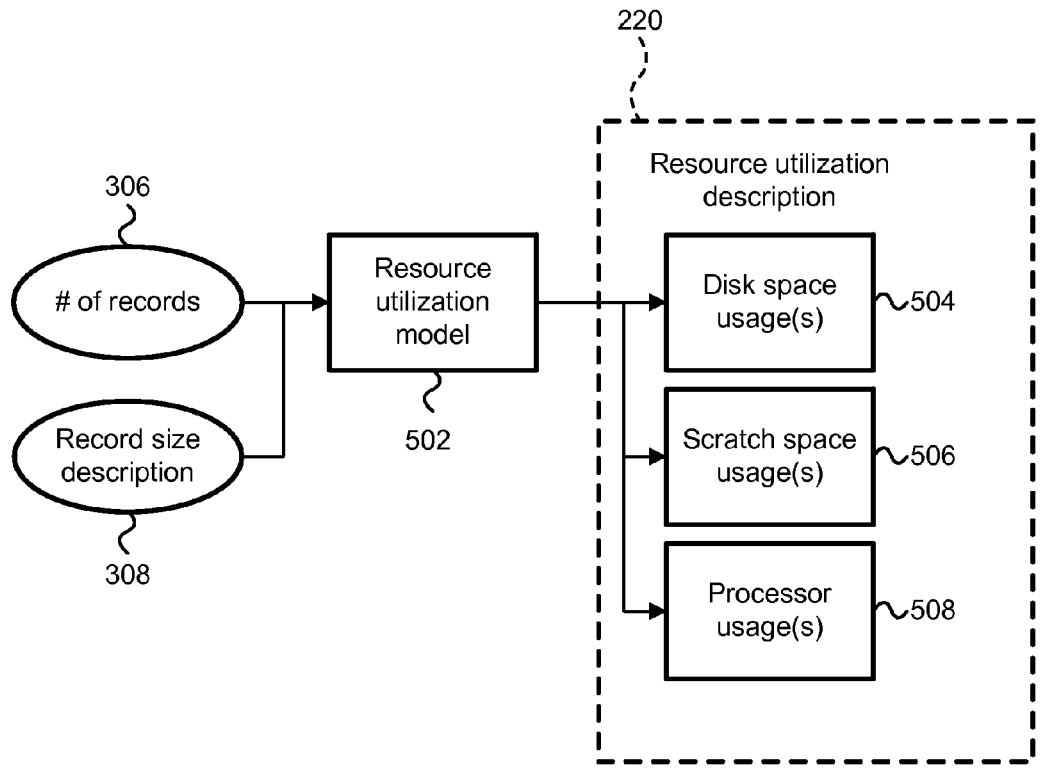
FIG. 5A is a schematic block diagram illustrating one embodiment of a resource utilization description in accordance with the present invention.

FIG. 5A is a schematic block diagram illustrating one embodiment of a resource utilization description 220 in accordance with the present invention. The resource utilization description 220 may comprise a resource utilization model 502 comprising a mathematical relationship between the number of records 306 and the record size description 308 for each operator 402, and the disk space usage 504, scratch space usage 506, and/or processor usage 508 for each operator 402. The resource utilization description 220 may comprise a disk space usage 504, scratch space usage 506, and/or processor usage 508 corresponding to each operator 402, and/or corresponding to each partition 216. The resource utilization description 220 may further comprise a disk space usage 504, scratch space usage 506, and/or processor usage 508 for the computer system 104 required to perform the job 116.

In one embodiment, the resource utilization description module 206 may be configured to calculate the disk space usage 504 by iterating through each vertical group 406 and summing a disk space usage 504 for each operator 402 in each vertical group 406 to determine the disk space usage 504 to support the target data set 217 and the job 116. The disk space usage 504 may be assigned to each partition 216 according to the partition information 120.

The resource utilization description module 206 may be configured to calculate the scratch space usage 506 by iterating through each scratch group 408 and selecting the maximum scratch space usage 506 of any scratch group 408 to determine the scratch space usage 506 to support the target data set 217 and the job 116. The scratch space usage 506 may be assigned to each partition 216 according to the partition information 120.

In one embodiment, the resource utilization description module 206 may be configured to calculate the processor usage 508 by iterating through each vertical group 406 and summing a processor usage 508 for each operator 402 in each vertical group 406 to determine the processor usage 508 to support the target data set 217 and the job 116. The processor usage 508 may be assigned to each partition 216 according to the partition information 120.

Figure 5B:
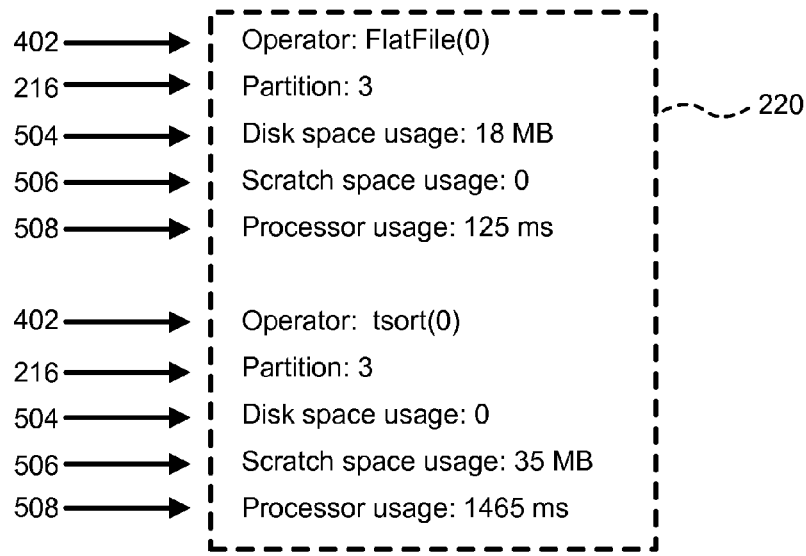
FIG. 5B is an illustration of an alternate embodiment of a resource utilization description in accordance with the present invention.

FIG. 5B is an illustration of an alternate embodiment of a resource utilization description 220 in accordance with the present invention. The resource utilization description 220 may represent an excerpt of a resource utilization description 220. According to the example of FIG. 5B, the operator 402 FlatFile(0) utilizes 18 megabytes (MB) of disk space 504, utilizes no scratch space 506, and utilizes 125 milliseconds (ms) of processor time 508 on partition 216 three to support the job 116. According to the example of FIG. 5B, the operator 402 tsort(0) utilizes no disk space 504, utilizes thirty-five MB of scratch space 506, and utilizes 1,465 milliseconds (ms) of processor time 508 on partition 216 three to support the job 116. The resource utilization description 220 may comprise usage values 504, 506, 508 for all operators 402 on all partitions 216.

Figure 6:
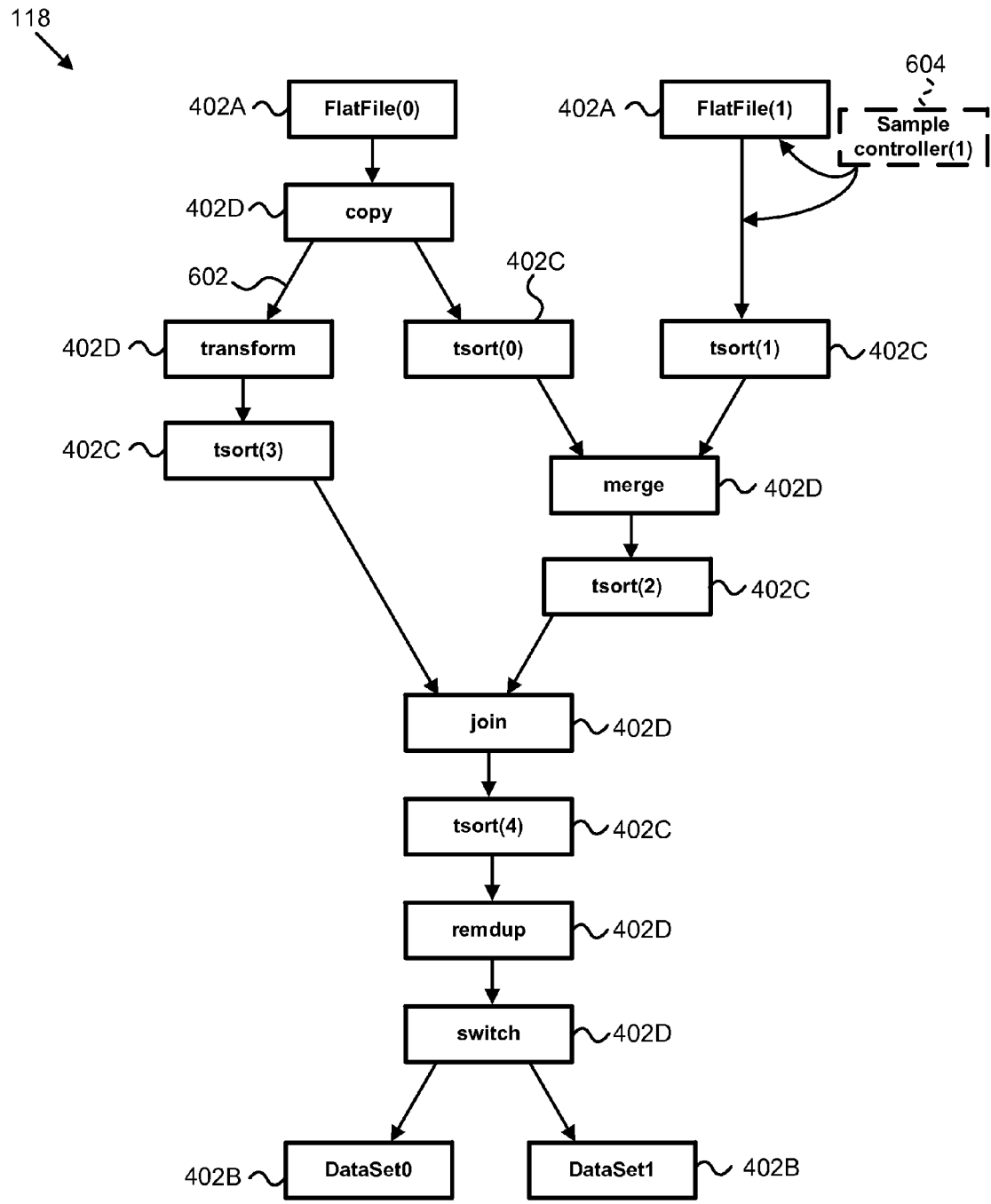
FIG. 6 is an illustration of one embodiment of a data flow graph in accordance with the present invention.

FIG. 6 is an illustration of one embodiment of a data flow graph 118 in accordance with the present invention. The data flow graph 118 may comprise one or more data source operators 402A which comprise an output link 602 but no input link 602. Most of the links 602 in FIG. 6 are not labeled to avoid unnecessarily cluttering the data flow graph 118. Each link 602 represents an output link 602 to the producing operator 402 (i.e. upstream operator), and an input link 602 to the consuming operator 402 (i.e. downstream operator). The data flow graph 118 may further comprise one or more data sink operators 402B which comprise an input link 602 but no output link 602. The data flow graph 118 may further comprise operators 402C which utilize intermediate memory, for example sorting operators 402C. Some operators 402 may comprise multiple output links 602—for example the operator 402D marked "copy" in FIG. 6. Some operators may comprise multiple input links 602—for example the operator 402D marked "join" in FIG. 6.

The sampling module 210 maybe configured to generate a sample controller 604 associated with each data source input 402A. The sample controllers 604 are configured to send data from the data source input 402A according to the data waves 218. A sample controller 604 for the data source input 402A marked "FlatFile(0)" is not shown in FIG. 6 to avoid unnecessary clutter in the Figure.

Figure 7:
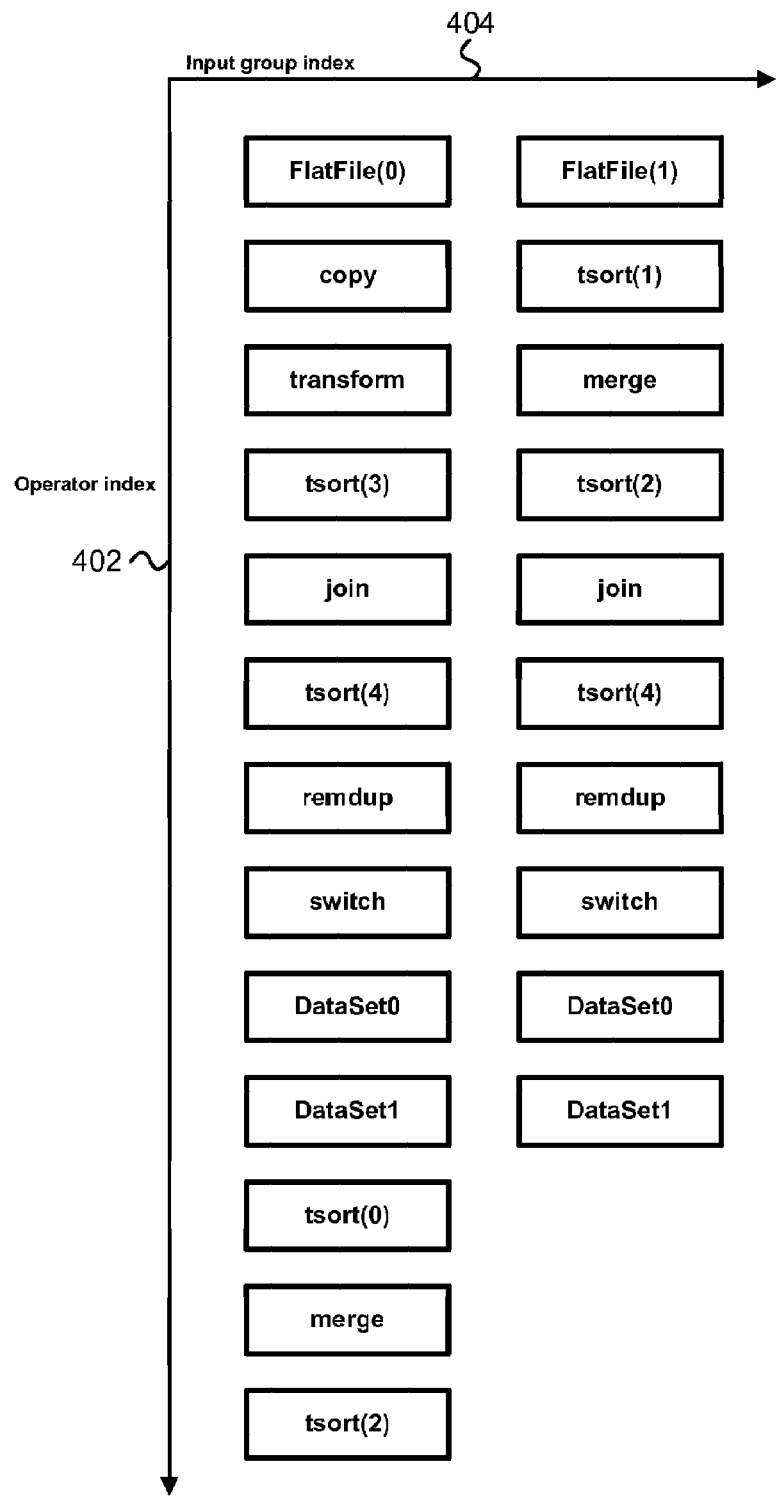
FIG. 7 is an illustration of one embodiment of input groups in accordance with the present invention.

FIG. 7 is an illustration of one embodiment of a plurality of input groups 404 in accordance with the present invention. The input groups 404 of FIG. 7 are consistent with the data flow graph of FIG. 6. The convention utilized to develop the input groups 404 of FIG. 7 is a left to right convention, where left-hand flowpaths are followed first. The example of FIG. 7 shows two input groups 404 developed from the data flow graph 118 of FIG. 6. Each input group 404 represents a data source operator 402A, each data sink operator 402B that depends upon the data source operator 402A, each operator 402 between the data source operator and the data sink operator, and any operators 402 that depend upon an output link 602 of any operator 402 already described in the input group 404.

For the first input group 404, the operators 402 FlatFile(0), copy, transform, tsort(3), join, tsort(4), remdup, switch, DataSet0, and DataSet1 are included based on the data source operator 402A and each data sink operator 402B that depends upon the data source operator 402A. There are operators 402 which depend upon an output link 602 of the operator 402D copy that are not included input group 404. Therefore, the operators 402 tsort(0), merge, and tsort(2) are included in the first input group 404. No further operators 402 depend upon an output link 602 of any operator 402 and the first input group 404 is therefore complete. It is a mechanical step for one of skill in the art to perform the parsing for the input group 404 in a computer algorithm given the principles described herein.

For the second input group, the operators 402 FlatFile(1), tsort(1), merge, tsort(2), join, tsort(4), remdup, switch, Dataset0, and DataSet1 are included based on the data source operator 402A and each data sink operator 402B that depends upon the data source operator 402A. There are no further operators 402 depending upon an output link 602 of the second input group 404, and the second input group 404 is therefore complete.

Figure 8:
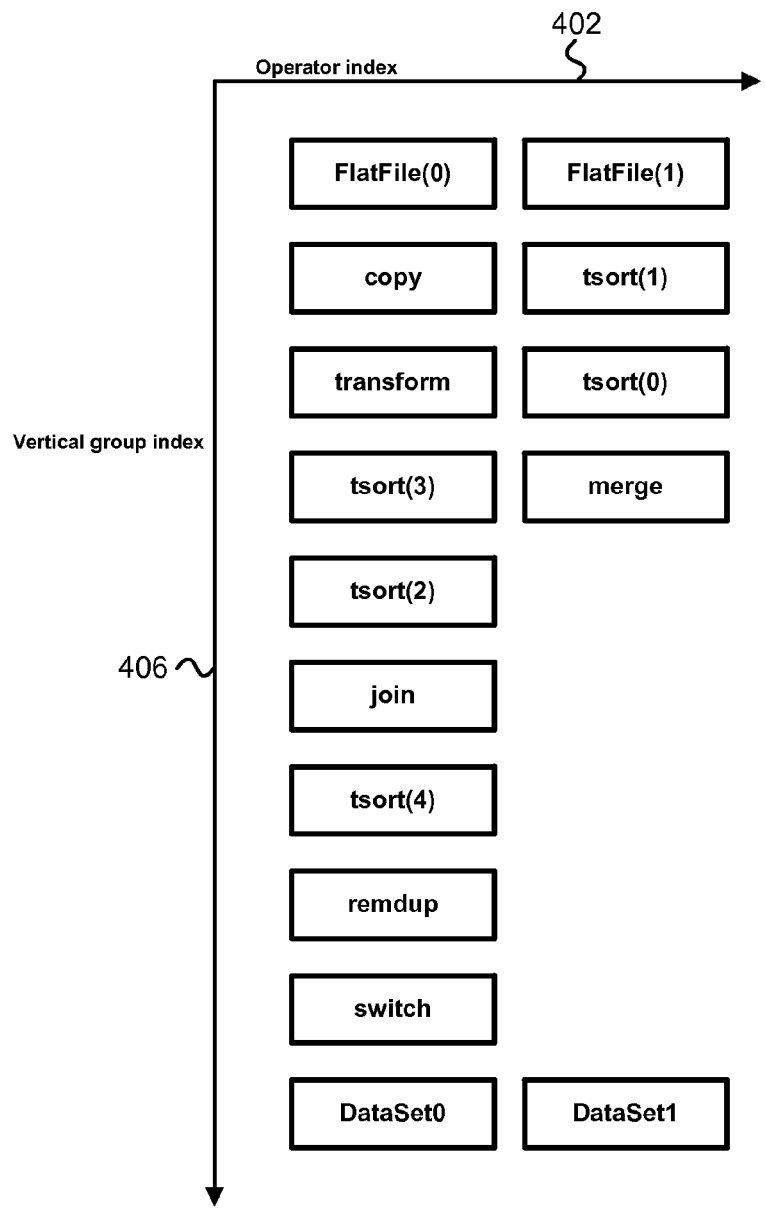
FIG. 8 is an illustration of one embodiment of a plurality of vertical groups in accordance with the present invention.

FIG. 8 is an illustration of one embodiment of a plurality of vertical groups 406 in accordance with the present invention. The vertical groups 406 of FIG. 8 are consistent with the data flow graph 118 of FIG. 6. The vertical group 406 parsing begins with a number of parsing threads equal to the number of data input sources 402A. The first vertical group 406 comprises each data input source 402A. The parsing then follows the execution order of the data flow graph 118, using the left to right convention, although any other convention may be used. Following the execution order, the second vertical group 406 comprises copy-tsort(1), then transform-tsort(0). Transform is selected because the left branch off of copy is selected first, and tsort(0) is selected because merge cannot operate until tsort(0) is complete. The remaining vertical groups 406 are straightforward: tsort(3)-merge, tsort(2), join, tsort(4), remdup, switch, and DataSet0-DataSet1. It is a mechanical step for one of skill in the art to perform the parsing for the vertical groups 406 in a computer algorithm given the principles described herein.

Figure 9:
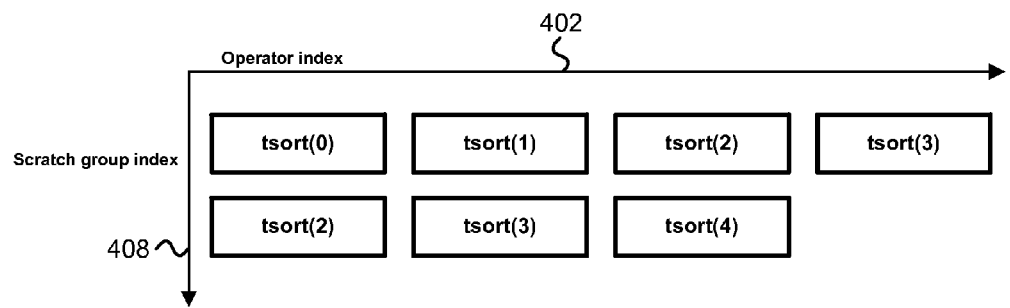
FIG. 9 is an illustration of one embodiment of at least one scratch group in accordance with the present invention.

FIG. 9 is an illustration of one embodiment of at least one scratch group 408 in accordance with the present invention. Each scratch group 408 represents a set of operators 402 utilizing scratch space, wherein the operators 402 may have an execution life cycle that interacts. From the data flow graph 118, it is apparent that tsort(3) can be operating while tsort(2) is being created from tsort(0) and tsort(1), and tsort(3) and tsort(2) clearly exist at the same time for the join 402D. However, tsort(4) will never co-exist with tsort(0) or tsort(1) based on the example data flow graph 118. Tsort(4) can co-exist with tsort(2) and tsort(3). Therefore, one scratch group 408 comprises tsort(0)-tsort(1)-tsort(2)-tsort(3), and the other scratch group 408 comprises tsort(2)-tsort(3)-tsort(4).

It is a mechanical step for one of skill in the art to perform the parsing for the vertical groups 406 in a computer algorithm given the principles described herein. Nevertheless, one example algorithm to generate scratch groups 408 based on the data flow graph 118 is provided for additional clarity. The example algorithm utilizes input groups 404 and vertical groups 406 in parsing the data flow graph 118 to determine the scratch groups 408. The steps of the example algorithm include:

1. Start from the first level vertical group 406.
2. Move onto the next level vertical group 406.
3. Go to step 2 if the current vertical group does not contain any operators 402 that need scratch space.
4. Remove all the operators that do not need scratch space from the current group 406.
5. The current group 406 becomes a scratch group 408.
6. Repeat steps 2 to 5 until iterations over all vertical groups 406 are complete.
7. Start from the first level scratch group 408. This group becomes the previous group.
8. Move onto the next level scratch group 408. This group becomes the current group.
9. Select an operator 402 that has not been searched in the current group. This operator 402 becomes the current operator.
10. Look up in the previous group for any operator 402 that is directly upstream (i.e. only one shared intervening operator 402) and in the same input group 404 of the current operator.
11. Move the current operator to the previous group if no operator 402 is found at step 10.
12. Repeat steps 9 to 11 until all the operators 402 in the current group have been searched.
13. Remove the current group if it is empty. Otherwise, the current group becomes the previous group.
14. Repeat steps 8 to 13 until all the scratch groups 408 have been searched.
15. Repeat steps 7 to 14 until no operator 402 in any scratch group 408 can be moved to its previous group.
16. Start from the first level scratch group 408. This group becomes the previous group.
17. Move onto the next level scratch group 408. This group becomes the current group.
18. Combine the current group with its previous group into a new scratch group 408. Remove any duplicate operators 402.
19. Select an operator 402 that has not been searched in the previous group. This operator 402 becomes the current operator.
20. Look up in the current group for any operator 402 that is directly downstream and in the same input group 404 of the current operator.
21. Move the current operator from the previous group to the current group if no operator found at step 20.
22. Repeat steps 19 to 21 until all the operators 402 in the previous group have been searched.

23. The current group becomes the previous group.

24. Repeat steps 17 to 23 until the last scratch group 408 is also combined with its previous group.

The schematic flow chart diagrams that follow are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Figure 10:
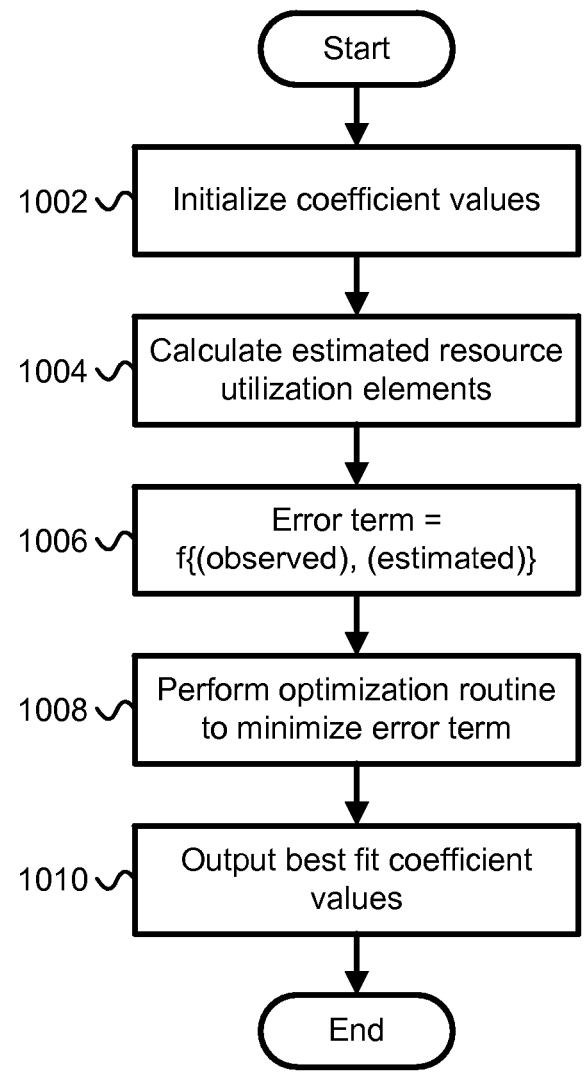
FIG. 10 is a schematic flow chart diagram illustrating one embodiment of calculating correlation coefficients in accordance with the present invention.

FIG. 10 is a schematic flow chart diagram illustrating one embodiment of calculating 1000 correlation coefficients in accordance with the present invention. The calculation 1000 may begin with the resource utilization description module 206 initializing 1002 the coefficient values. The resource utilization description module 206 may then calculate 1004 estimated resource utilization elements, and determine 1006 an error term that comprises a function of observed resource utilization elements and the estimated resource utilization elements. The resource utilization description module 206 may perform 1008 an optimization routine to minimize the error term, and output 1010 the best fit coefficient values to a resource utilization model 502.

Figure 11A:
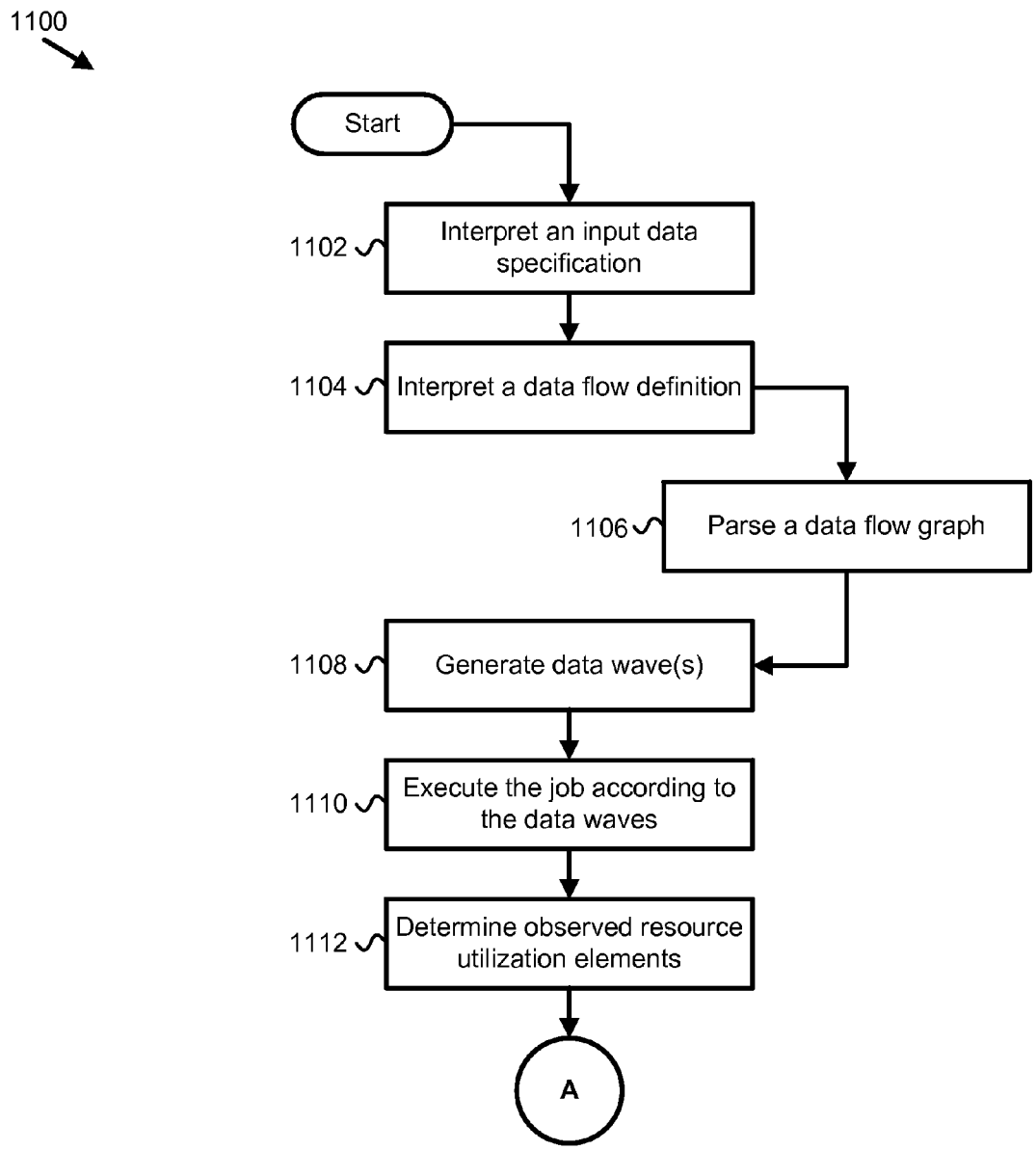
FIG. 11A is a schematic flow chart diagram illustrating one embodiment of a method for determining a resource utilization description for a parallel data processing system in accordance with the present invention.

FIG. 11A is a schematic flow chart diagram illustrating one embodiment of a method 1100 for determining a resource utilization description 220 for a parallel data processing system in accordance with the present invention. The method 1100 includes the input data specification module 202 interpreting 1102 an input data specification 110, and the data flow module 204 interpreting 1104 a data flow definition 214. The method 1100 may include the data flow module 204 parsing 1106 a data flow graph 118 to determine a plurality of vertical groups 406 and at least one scratch group 408. The method 1100 may include a sampling module 210 generating 1108 at least one data wave 218, and the resource estimation tool 124 executing 1110 the job 116 according to the data wave(s) 218. The resource utilization description module 220 may determine 1112 observed resource utilization elements based on the job 116 execution.

Figure 11B:
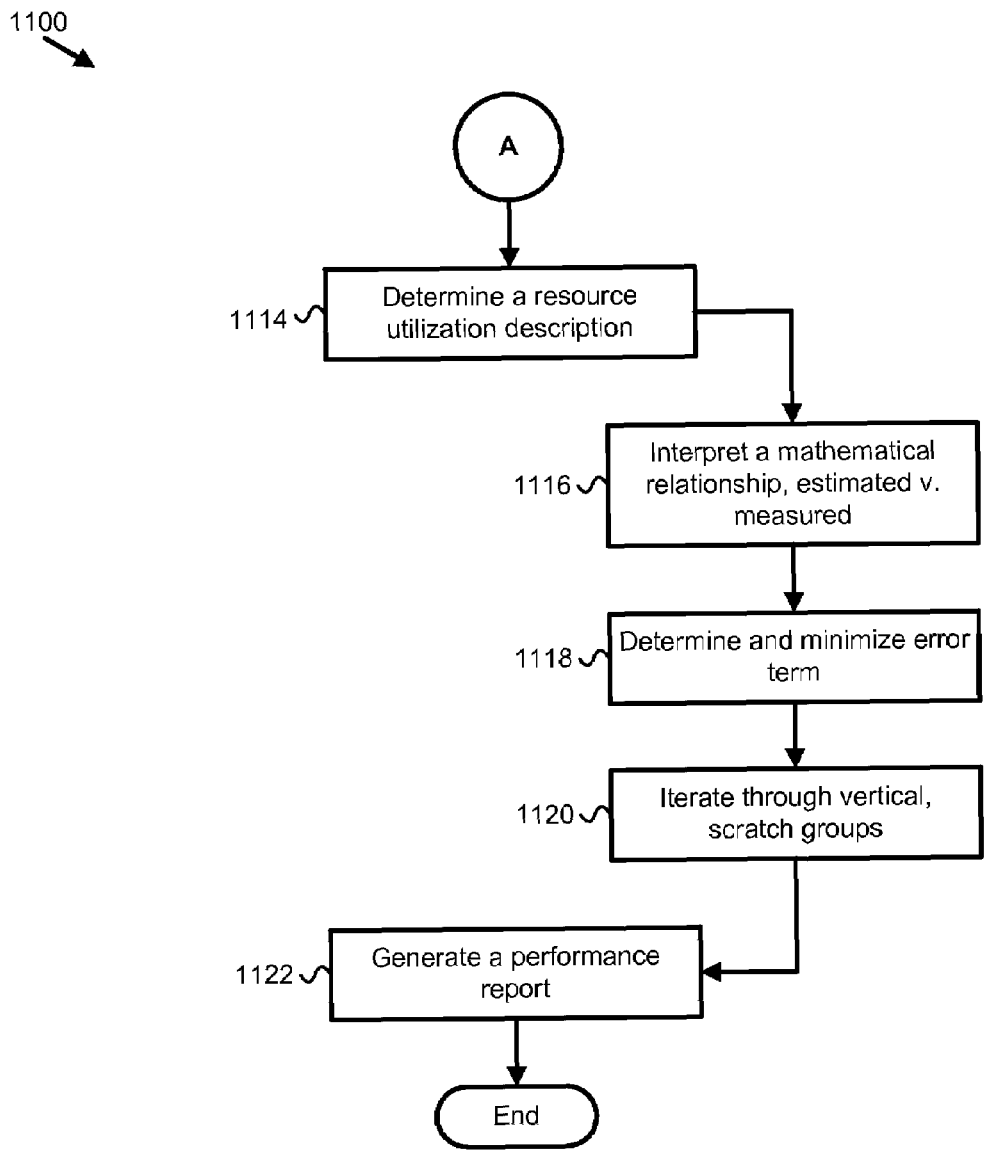
FIG. 11B is a continuing schematic flow chart diagram illustrating one embodiment of a method for determining a resource utilization description for a parallel data processing system in accordance with the present invention.

FIG. 11B is a continuing schematic flow chart diagram illustrating one embodiment of a method 1100 for determining a resource utilization description 220 for a parallel data processing system in accordance with the present invention. The method 1100 may continue with the resource utilization description module 206 determining 1114 a resource utilization description 220 based on the input data specification 110 and the data flow definition 214. The resource utilization description module 206 may interpret 1116 a mathematical relationship, comprising correlation coefficients, between the input data specification 110, specifically a set of information associated with at least one data source operator 402A, and the resource utilization description 220. The resource utilization description module 206 may determine 1118 and an error term between an estimated resource utilization and a measured resource utilization, and calculate the correlation coefficients manipulating the coefficients to minimize the error term.

The resource utilization description module 206 may iterate 1120 through each vertical group 406, and sum a disk space requirement of each vertical group to support the target data set 217, to determine the resource utilization description 220. The resource utilization description module 206 may further iterate 1120 through each scratch group 408, and select the maximum scratch space requirement of any scratch group 408 to support the target data set 217, to determine the resource utilization description 220. The resource utilization description module 206 may further iterate 1120 through each vertical group 406, and sum a processor usage requirement of each vertical group to support the target data set 217, to determine the resource utilization description 220. The performance reporting module 208 may generate 1122 a performance report based on the resource utilization description 220.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus for developing a resource utilization description for a parallel data processing system, the apparatus comprising:
    an input data specification module configured to interpret an input data specification comprising at least one data source operator, and a set of information associated with the at least one data source operator, the set of information comprising a target data set;
    a data flow module configured to interpret a data flow definition comprising a data integration processing flow;
    a resource utilization description module configured to determine a resource utilization description based on the input data specification and the data flow definition, wherein the resource utilization description comprises disk space usage; and
    a performance reporting module configured to generate a performance report based on the resource utilization description.

2. The apparatus of claim 1, wherein the resource utilization description further comprises scratch space usage.

3. The apparatus of claim 2, wherein the data flow definition comprises a plurality of operators, and a plurality of vertical groups, each vertical group comprising at least one of the plurality of operators expected to execute in parallel, wherein the plurality of operators comprise a set of operators included in a data graph, including the at least one data source operator.

4. The apparatus of claim 3, wherein the data flow definition further comprises at least one scratch group comprising at least one of the plurality of operators expected to access intermediate memory in parallel based on the data graph.

5. The apparatus of claim 4, wherein the data flow module is further configured to interpret the data flow definition by parsing the data graph to determine the plurality of vertical groups, and the at least one scratch group.

6. The apparatus of claim 5, wherein the resource utilization description module is further configured to calculate the at least one disk space usage by iterating through each vertical group and summing a disk space requirement of each vertical group to support the target data set.

7. The apparatus of claim 5, wherein the resource utilization description module is further configured to calculate the at least one scratch space usage by iterating through each scratch group and selecting the maximum scratch space of any scratch group as the at least one scratch space usage.

8. The apparatus of claim 5, wherein the resource utilization description module is further configured to determine the resource utilization description by interpreting a resource utilization model comprising a mathematical relationship between the set of information associated with the at least one data source operator and the resource utilization description, and wherein the set of information associated with the at least one data source operator further comprises a number of records, and a record size description.

9. The apparatus of claim 8 wherein the input data specification further comprises sampling instructions, the apparatus further comprising a sampling module configured to generate at least one data wave from the target data set and the sampling instructions, and to generate a sampling controller associated with each data source operator, each sampling controller configured to provide data from each data source operator according to the at least one data wave during a job execution.

10. The apparatus of claim 9, wherein the sampling instructions comprise at least one member selected from the group consisting of a data range, a random seed, and a data percentage.

11. The apparatus of claim 9, further comprising a partition module configured to interpret a plurality of partitions, wherein the data flow definition further comprises operator partition information relating each of the plurality of operators to at least one of the plurality of partitions.

12. The apparatus of claim 11, wherein the resource utilization description further comprises at least one member selected from the group consisting of:
   a plurality of disk space usage values corresponding to the plurality of partitions;
   a plurality of scratch space usage values corresponding to the plurality of partitions; and
   a plurality of processor usage values corresponding to the plurality of partitions.

13. The apparatus of claim 12, wherein the at least one data wave comprises n data waves, wherein a size of the $n^{th}$ data wave differs from the size of the first data wave by a ratio between 1 and n, inclusive, wherein n represents a small integer value between 1 and about 100, inclusive.

14. The apparatus of claim 13, wherein n is about ten, and wherein the data wave sizes change in a linear manner from the first data wave to the $n^{th}$ data wave.

15. The apparatus of claim 12, wherein the mathematical relationship between the set of information associated with the at least one data source operator and the resource utilization description comprises a plurality of correlation coefficients, and wherein interpreting the resource utilization model comprises calculating the plurality of correlation coefficients.

16. The apparatus of claim 15:
   further comprising a plurality of estimated resource utilization elements each comprising an estimated resource utilization contribution associated with one of a plurality of operation elements;
   further comprising a plurality of observed resource utilization elements each comprising an observed resource utilization contribution associated with one of the plurality of operation elements, the observed resource utilization elements determined according to the job execution;
   wherein the resource utilization description module is further configured to calculate the plurality of estimated resource utilization elements based on a defined relationship with the plurality of operation elements utilizing the correlation coefficients;
   wherein the resource utilization description module is further configured to calculate the correlation coefficients by manipulating the correlation coefficients to minimize an error term, the error term comprising a representation of the difference between each estimated resource utilization element and each observed resource utilization element; and
   wherein the resource utilization description module is further configured to calculate the resource utilization description based on the target data set and the correlation coefficients.

17. The apparatus of claim 16, wherein the defined relationship comprises a member selected from the group consisting of a linear relationship, a polynomial relationship, an exponential relationship, and a logarithmic relationship.

18. A computer program product comprising a computer useable medium including a computer readable program, wherein the computer readable program when executed on a computer causes the computer to:
   interpret an input data specification comprising at least one data source operator comprising data records, and a set of information associated with the at least one data source operator, the set of information comprising a target data set;
   interpret a data flow definition comprising:
      a data integration processing flow comprising a plurality of vertical groups and a plurality of scratch groups relating a plurality of operators, each vertical group comprising at least one of the operator expected to execute in parallel, each scratch group comprising at least one of the operators expected to access intermediate memory in parallel, wherein the plurality of operators comprise a set of operators included in a data graph, including the at least one data source operator;
      partition information relating each of the plurality of operators and each of the at least one data source operators to at least one of the plurality of partitions;
   determine a resource utilization description, comprising at least one disk space usage, based on the input data specification and the data flow definition; and
   generate a performance report based on the resource utilization description.

19. The computer program product of claim 18, wherein interpreting the data flow definition comprises parsing a data graph to determine the plurality of vertical groups, and the at least one scratch group.

20. The computer program product of claim 19, wherein parsing the data graph to determine the plurality of vertical groups comprises:
   setting a first vertical group comprising all data source operators, and setting the first vertical group to a previous vertical group;
   creating consecutive vertical groups by following a set of output links of operators within the previous vertical group such that each created vertical group comprises a next set of operators wherein the input links for the next set of operators are fully defined by the output links of the operators of all previous vertical groups, and setting each created vertical group to the previous vertical group, until all operators within the data graph are assigned to a vertical group.

21. The computer program product of claim 20, wherein parsing the data graph to determine the at least one scratch group comprises sequentially selecting each operator from the data graph utilizing intermediate memory as an operator of interest, sequentially generating a preliminary scratch group for each operator of interest, wherein each preliminary scratch group comprises the operator of interest and any other operators utilizing intermediate memory at any shared time with the operator of interest according to the data flow graph, and eliminating preliminary scratch groups which comprise one of an identical set of operators and a subset of operators, to other preliminary scratch groups.

22. The computer program product of claim 21, wherein the input data specification further comprises sampling instructions, the computer program product further comprising generating at least one data wave from the target data set, and providing data from each data source operator according to the at least one data wave during a job execution.

23. The computer program product of claim 22, wherein generating the at least one data wave comprises dividing the sample data into n data waves, wherein a size of the $n^{th}$ data wave differs from the size of the first data wave by a ratio between 1 and n, inclusive, wherein n represents a small integer value between 1 and about 100, inclusive.

24. The computer program product of claim 23, further comprising:
interpreting a mathematical relationship between the set of information associated with the at least one data source operator and the resource utilization description, the mathematical relationship comprising a plurality of correlation coefficients;
determining an error term between an estimated resource utilization and a measured resource utilization; and
calculating the plurality of correlation coefficients by manipulating the correlation coefficients to minimize the error term.

25. The computer program product of claim 24, wherein the mathematical relationship comprises a member selected from the group consisting of a linear relationship, a polynomial relationship, an exponential relationship, and a logarithmic relationship.

26. The computer program product of claim 25, wherein generating a performance report based on the resource utilization description comprises generating a report comprising a disk space usage for each of the operators on each partition, a scratch space usage for each of the operators on each partition, a processor usage for each of the operators on each partition, and a disk space usage, scratch space usage, and processor usage for the entire target data set.

27. The computer program product of claim 25, wherein determining the resource utilization description comprises:
iterating through each vertical group and summing a disk space requirement of each vertical group to support the target data set; and
iterating through each scratch group and selecting the maximum scratch space of any scratch group as the scratch space requirement to support the target data set.

28. A method for optimizing a parallel data integration job on a computer system, the method comprising:
receiving a proposed data flow graph, proposed partition information, and a proposed input data specification comprising at least one data source operator, and a set of information associated with the at least one data source operator, the set of information comprising a proposed data set, and sampling information;
creating a target data flow graph based on the proposed data flow graph, a target partition information based on the proposed partition information, and a target input data specification based on the proposed input data specification;
executing a resource estimation tool comprising:
an input data specification module configured to interpret the target input data specification;
a data flow module configured to interpret a data flow definition based on the target data flow graph and the target partition information;
a resource utilization description module configured to determine a resource utilization description based on the target input data specification and the data flow definition, wherein the resource utilization description comprises at least one member selected from the group comprising a plurality of disk space usage values, a plurality of scratch space usage values, and a plurality of processor usage values; and
a performance reporting module configured to generate a performance report based on the resource utilization description.

29. The method of claim 28, further comprising:
creating at least one alternative embodiment of the proposed data flow graph;
sequentially setting the target data flow graph to each alternate data flow graph and sequentially executing the resource estimation tool to generate a plurality of performance reports; and
providing a data flow graph recommendation based on the plurality of performance reports.

30. The method of claim 28, further comprising providing a hardware recommendation based on the plurality of performance reports.

* * * * *

UNITED STATES PATENT AND TRADEMARK OFFICE
CERTIFICATE OF CORRECTION

| | |
|---|---|
| PATENT NO. | : 7,660,884 B2 |
| APPLICATION NO. | : 11/558753 |
| DATED | : February 9, 2010 |
| INVENTOR(S) | : Xiaoyan Pu |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 711 days.

Signed and Sealed this

Thirtieth Day of November, 2010

David J. Kappos
*Director of the United States Patent and Trademark Office*